Dec. 11, 1945.　　　C. W. GINTER　　　2,390,832
OIL PUMP
Filed April 26, 1944
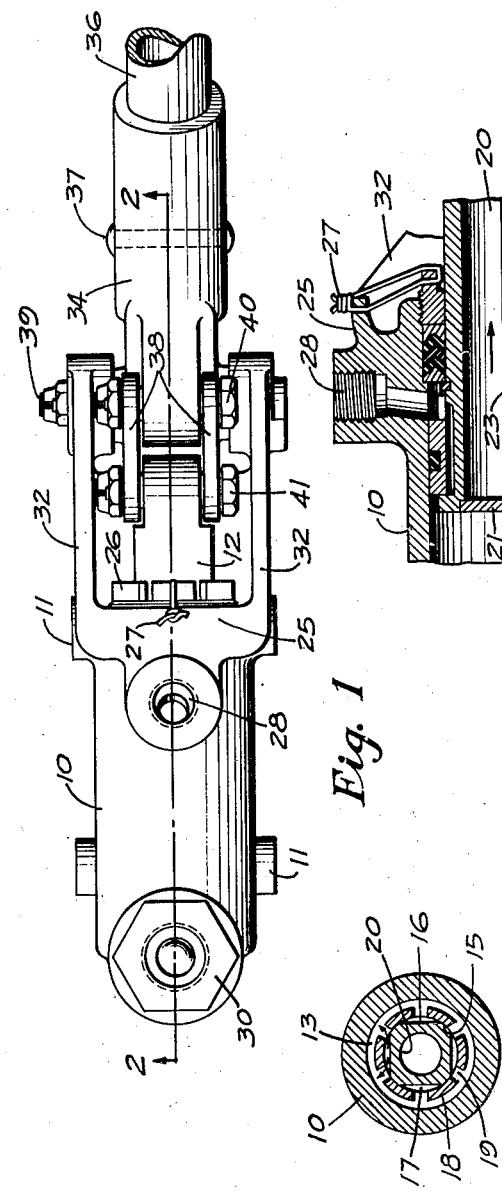
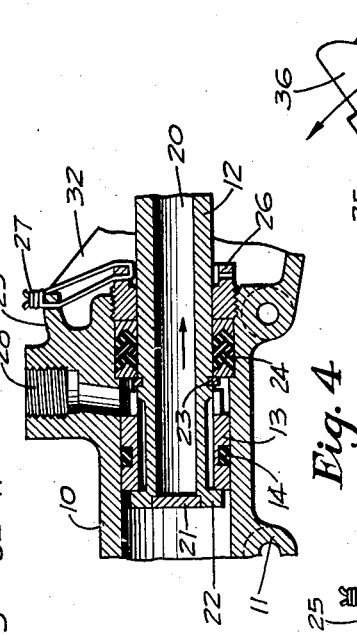
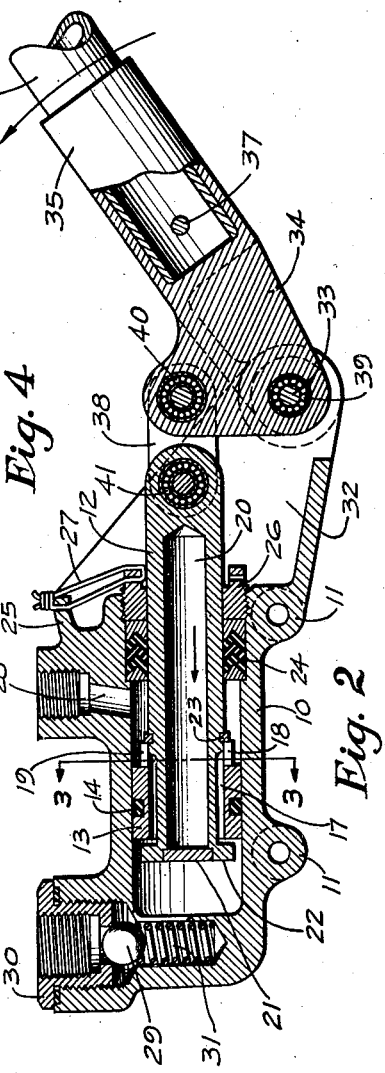
INVENTOR.
Charles W. Ginter
BY Baird Freeman
ATTYS.

Patented Dec. 11, 1945

2,390,832

UNITED STATES PATENT OFFICE 2,390,832

OIL PUMP

Charles W. Ginter, Bryan, Ohio, assignor to The Aro Equipment Corporation, Bryan, Ohio, a corporation of Ohio Application April 26, 1944, Serial No. 532,742

2 Claims. (Cl. 103—178)

My present invention relates to a pump for oil or other liquids and is particularly adapted as an emergency hand pump for operating the hydraulically controlled landing gear of an aircraft.

One object of the invention is to provide a pump structure which is light in construction yet sturdy to give heavy duty operation at relatively high pressure of the oil pumped thereby and which is economical to manufacture and easy to assemble.

Another object is to provide a relatively simple pump structure which, though having a single reciprocating plunger, is double acting so as to secure a substantially constant flow of oil during both the up and down strokes of the operating handle.

Still another object is to provide a pump structure which includes an intake check valve and has a floating piston on a plunger so as to provide double acting operation and eliminate the necessity of an outlet check valve.

A further object is to provide a simple arrangement for mounting a bell crank and operating lever for the purpose of reciprocating the plunger of the pump with a minimum of manual effort.

With these and other objects in view, my invention consists in the construction, arrangement and combination of the various parts of my pump structure whereby the objects contemplated are attained, as hereinafter more fully set forth, pointed out in my claims and illustrated in the accompanying drawing, wherein:

Figure 1 is a plan view of an oil pump embodying my invention.

Figure 2 is a vertical sectional view thereof on the line 2—2 of Figure 1.

Figure 3 is a vertical sectional view on the line 3—3 of Figure 2 showing a passage arrangement between the plunger and the piston of the pump; and Figure 4 is a sectional view similar to a portion of Figure 2 showing the parts in a different position.

On the accompanying drawing, I have used the reference numeral 10 to indicate a cylinder and 12 a piston reciprocable therein. Fitting the bore of the cylinder 10 is a sleeve-like piston 12. The piston 12 has a packing ring 14 to seal the periphery of the piston relative to the bore while the interior of the piston is slidable on four surfaces 15 between which relieved flat spots 16 are provided (as shown in Figure 3) to form passageways indicated at 17. The piston also has several extending portions 18 which are formed by slotting the piston at 19 and the slots form passageways for a purpose which will hereinafter appear.

The plunger 12 is hollowed out as shown at 20 to reduce the weight thereof and is plugged as illustrated at 21 so that it is not subsequently filled with oil during operation. The plug 21 is an oil tight press fit in a head 22 of the plunger, which head is adapted at times to contact with the left end of the piston as in Figure 4 to seal off the passageways 17. Spaced from the head 22 is a stop ring 23 and the distance between the stop ring and the head is slightly greater than the length of the piston 13 and its extensions 18. At one end the cylinder contains packing 24 retained in position by a packing nut 26 and the nut is locked against loosening by a lock wire 27. The lock wire 27 passes through a perforated lug 25 of the cylinder 10.

The cylinder 10 has an outlet 28 adjacent the packing 24 and adjacent its other end is an intake check valve 29 of ball type. The ball 29 seats against a removable plug 30 which plug as well as the outlet 28 are threaded to receive pipes or copper tube fittings for respectively receiving oil from a storage tank and discharging it to the landing gear or other hydraulic mechanism to be operated by the pump. The check valve 29 is normally seated by a spring 31.

The cylinder 10 has a pair of side plates 32 carrying a pivot pin 33 for a bell crank 34. The bell crank is provided with a socket portion 35 to receive a tubular handle 36 which may be pinned in position by a rivet 37. A pair of links 38 operatively connect the bell crank to the plunger 12 and needle bearings 39, 40 and 41 are preferably provided for the bell crank and the links to minimize the friction against which the operator must oscillate the handle 36.

Practical operation

In the operation of my pump structure, assuming the handle 36 is being raised as in Figure 2, the plunger 12 is being pushed inwardly or toward the left. Accordingly oil trapped in the cylinder 10 on the outlet side of the check valve 29 passes between the head 22 of the plunger and the piston 13 and then through the passageways 17 and 19 to the outlet 28. All the oil displaced by the plunger and piston however, is not forced out through the outlet because of the displacement of the incoming plunger 12. Accordingly on the reverse stroke, as shown in Figure 4, when friction holds the piston at the beginning of the plunger stroke to the right, the piston will seal against the head 22 and the space in the cylinder surrounding the plunger to the right of the piston will be contracted and another charge of oil forced out through the outlet 28. At the same time a new charge is being drawn in through the check valve 29. The pump is thus double acting—that is, it forces oil through the outlet on both the up stroke and the down stroke of the handle. By having the area of the plunger equal to half the area of the cylinder, the same amount of oil is displaced when the stroke takes place in one direction as when it takes place in the opposite direction without the necessity of having to provide two cylinders and two pistons. At the same time, by designing the piston for limited sliding movement on the plunger, and the sealing contact as in Figure 4 of the piston against the head 22, the need for an outlet check valve is eliminated.

The piston 10 has a pair of mounting bosses 11 which, it will be noted by reference to Figure 1, extend all the way from side to side of the cylinder. Accordingly the cylinder can be mounted either right hand or left hand as required. My pump structure is relatively simple to manufacture and efficient in operation and is readily adapted for mass production. Manual operation is comparatively easy and due to the double acting character of the pump, a continuous flow of oil is had and the operating pressure required on the handle is divided between the up and down strokes instead of being necessary in connection with only one of the strokes as in a single acting pump.

Some changes may be made in the construction and arrangement of the parts of my oil pump without departing from the rear spirit and purpose of my invention, and it is my intention to cover by my claims any modified forms of structure or use of mechanical equivalents which may be reasonably included within their scope without sacrificing any of the advantages thereof.

I claim as my invention:

1. In a double acting oil pump, a cylinder, a plunger reciprocable therein and having a cross sectional area substantially half that of the cylinder, a packing at one end of said cylinder surrounding said plunger, a tubular piston mounted for sliding movement on said plunger, said plunger having a head against which said piston seals when the plunger is pulled outwardly relative to said cylinder and a surface portion concentric with said cylinder, a stop ring carried by said plunger adjacent said surface portion for engaging said piston to push the piston when the plunger is pushed inwardly relative to the cylinder, said tubular piston having a guide portion slidably receiving said surface portion, and longitudinal slots through said guide portion to the end of said piston to permit oil flow through said piston from the intake end of said cylinder to the outlet end thereof when said plunger is pushed inwardly, said piston at that time being spaced from said head and engaged by said stop.

2. In an oil pump of the character disclosed, a cylinder, a plunger reciprocable therein, a packing at one end of the cylinder surrounding the plunger, an outlet port there adjacent, an intake check valve adjacent the other end of the cylinder, a piston mounted for limited telescoping movement on said plunger, said plunger having longitudinal depressed portions to permit liquid flow along said plunger within said piston and having a head against which said piston seals when the plunger is pulled outwardly relative to said cylinder, said plunger having a guide surface spaced from said head, said piston having a guide surface coacting therewith, said cylinder having passage means through said last guide surface to permit oil flow through said piston from the intake end of said cylinder to the outlet end thereof when said plunger is pushed inwardly.

CHARLES W. GINTER.